(12) United States Patent
Lynch

(10) Patent No.: US 6,824,335 B2
(45) Date of Patent: Nov. 30, 2004

(54) LOCK DRILLING TEMPLATE

(75) Inventor: Thomas A. Lynch, Tappan, NY (US)

(73) Assignee: Lockmasters, Inc., Nicholasville, KY (US)

( * ) Notice: Subject to any disclaimer, the term of this patent is extended or adjusted under 35 U.S.C. 154(b) by 190 days.

(21) Appl. No.: 10/300,350

(22) Filed: Nov. 20, 2002

(65) Prior Publication Data

US 2004/0096282 A1 May 20, 2004

(51) Int. Cl.[7] .............................................. B23B 49/02
(52) U.S. Cl. ....................... 408/115 R; 70/465; 408/79
(58) Field of Search .............................. 408/1 R, 72 B, 408/79, 115 R, 115 B, 241 B; 70/465

(56) References Cited

U.S. PATENT DOCUMENTS

| | | | |
|---|---|---|---|
| 2,381,943 A | | 8/1945 | Williams ........................ 77/62 |
| 2,423,164 A | | 7/1947 | Williams ........................ 77/62 |
| 2,424,485 A | | 7/1947 | Miller ............................ 77/62 |
| 2,466,023 A | * | 4/1949 | Griffin .......................... 408/79 |
| 2,906,148 A | | 9/1959 | Mikeska ........................... 81/3 |
| 3,280,661 A | | 10/1966 | Robertson ....................... 77/62 |
| 3,816,899 A | | 6/1974 | Kitts ............................ 29/263 |
| 4,156,375 A | | 5/1979 | Crasnianski ...................... 81/3 |
| 4,261,093 A | | 4/1981 | Steffen et al. ............. 29/426.4 |
| 4,447,176 A | | 5/1984 | Blough et al. ................. 408/72 |
| 4,586,233 A | | 5/1986 | Markisello .................. 29/426.4 |
| 4,662,201 A | | 5/1987 | Phillips ........................ 70/465 |
| 4,714,386 A | | 12/1987 | Phillips ........................ 408/72 |
| 5,454,245 A | * | 10/1995 | Markisello .................... 70/252 |
| 5,701,773 A | | 12/1997 | Markisello .................... 70/465 |
| 5,713,225 A | * | 2/1998 | Smith ............................ 70/51 |
| 5,984,594 A | | 11/1999 | Osborne et al. |
| 6,305,886 B1 | * | 10/2001 | Womack ....................... 408/103 |
| 6,725,697 B1 | * | 4/2004 | Leadon ......................... 70/465 |

FOREIGN PATENT DOCUMENTS

| | | | | |
|---|---|---|---|---|
| GB | 793954 | * | 4/1958 | ............. 408/115 R |
| JP | 57-48410 | * | 3/1982 | ............. 408/115 R |

* cited by examiner

*Primary Examiner*—Daniel W. Howell
(74) *Attorney, Agent, or Firm*—Wood, Herron & Evans, LLP

(57) ABSTRACT

A template for drilling a lock to gain access to a locked enclosure has a drill guide and a dial ring mounted to a key stud. A key blank may be inserted into the key stud, with the portion of the key blank which is insertable into the keyway of a lock extending from the template. The key lank is inserted into the keyway of a lock to position the template on the lock and the drill guide is manipulated to align a mark on the drill guide with a graduation on the dial ring to indicate a desired location for drilling a retainer of the lock.

14 Claims, 1 Drawing Sheet

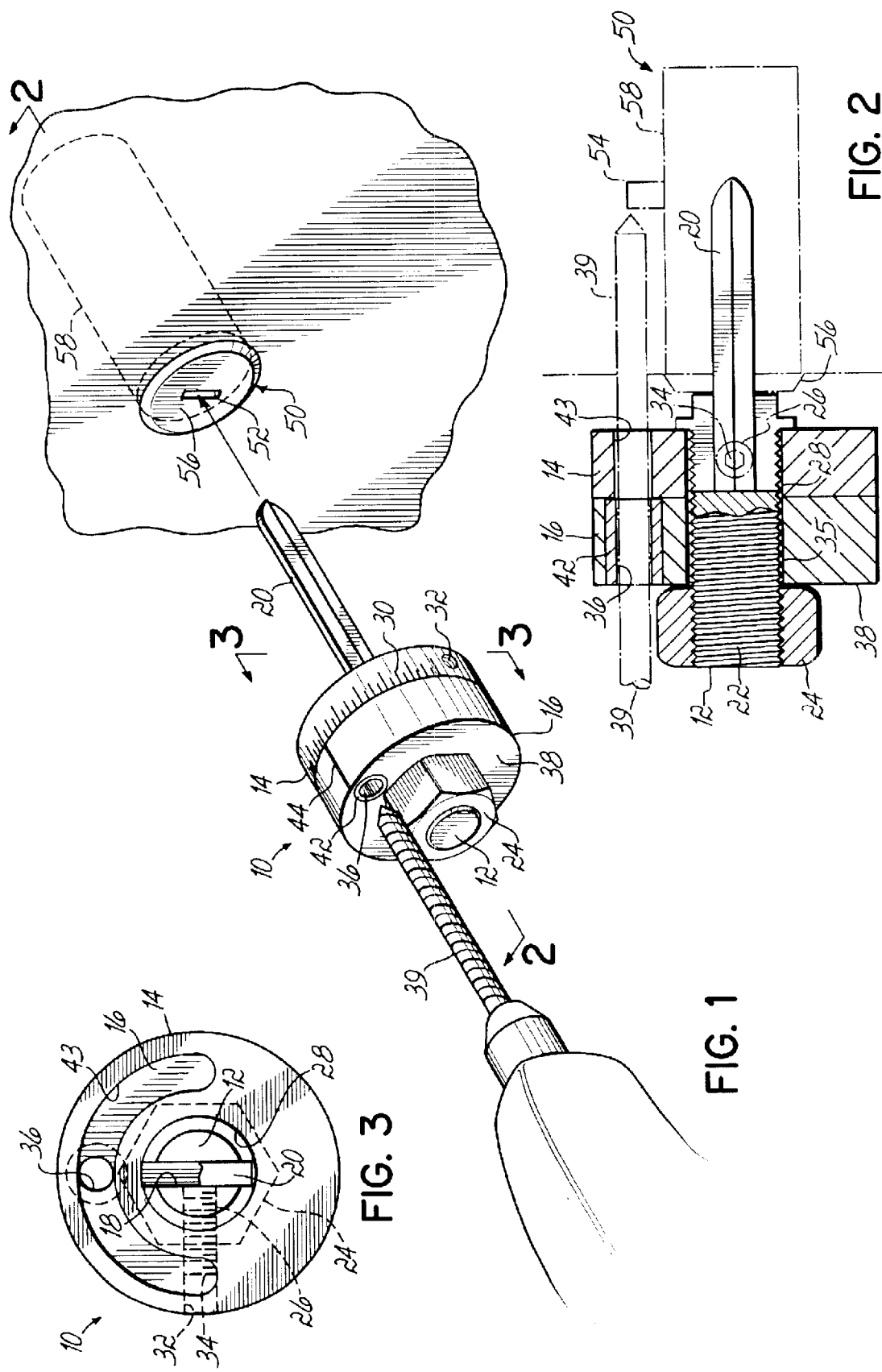

LOCK DRILLING TEMPLATE

FIELD OF THE INVENTION

This invention pertains to locksmith's tools and methods, and more particularly to a method and apparatus for drilling locks.

BACKGROUND OF THE INVENTION

In many situations it is desired to gain legitimate access to a locked entry or enclosure by circumventing a lock, such as when a key has been lost or damaged and no other key to the lock can be found. U.S. Pat. Nos. 5,984,594 and 4,714,386, assigned to the assignee of the present invention, disclose apparatus and methods for gaining access to locked enclosures made from hardened or heavy gauge material, such as combination safes. These devices include a drill rig structure which may be attached to a safe to support a drill adjacent to the lock of the safe. Once a desired drilling location has been determined, the drill rig is used to gradually advance the drill into the material to create a hole through which the internal workings of the lock may be viewed. The hole permits the correct combination to be ascertained, whereby the safe may be opened. While these devices are useful for gaining access to heavy-duty safes, a number of other lockable closures are not constructed as sturdily and simpler means may be used to gain access to the closure. For example, conventional cabinet drawers, and doors such as those used on entries to rooms, residences, and buildings, generally are not constructed to withstand drilling. Furthermore, these types of closures are typically secured with a key lock, whereby the ability to view the internal workings of the lock can only be gained at the expense of damaging the lock and will not generally facilitate opening the lock.

Prior methods of gaining access to a key-locked closures include the picking of locks, which requires a significant amount of time and skill and may ultimately result in damage to the lock. Furthermore, gaining access by picking the lock may be difficult when faced with an improved, pick-proof type lock. Other methods of gaining access to a locked enclosure may cause damage to the keyway or the lock cylinder requiring replacement of the lock cylinder. However, replacement of the lock cylinder is not desirable due to the expense and difficulty of obtaining a new cylinder. This is especially true if the same or similarly keyed locks are used throughout a facility whereby the replaced cylinder would have to be re-keyed to match existing locks.

There is thus a need for a method and apparatus for gaining legitimate access to locked enclosures which overcomes drawbacks of prior art methods and apparatus, such as those described above.

SUMMARY OF THE INVENTION

The present invention provides a lock drilling template and method for gaining legitimate access to a locked enclosure using the lock drilling template. Advantageously, access may be obtained while preserving the keyway and lock cylinder for subsequent use and while causing only minimal damage to the lock housing. In this regard, the lock drilling template may be used to accurately locate a correct position on a lock housing for drilling a small hole through the housing to disable one or more retainers which secure the lock cylinder in the housing. The lock drilling template may be used on a variety of different types of keyed locks to indicate a correct location for drilling a hole through the lock retainer, which may be a pin, button, bolt, or other retaining device.

In one aspect of the invention, a key blank for a lock may be coupled to a first member of the drilling template such that the template can be located on the lock by inserting the key blank into the lock. The template includes a second member, having marks disposed on its surface to indicate orientation with respect to the key blank, and a third member which is movable with respect the second member. The third member has a hole that is sized to receive a drill bit, whereby alignment of the hole with one of the marks on the second member indicates a desired location for drilling into the lock.

In another aspect of the invention, a kit for drilling locks includes a first member couplable with a key blank for a lock, a second member coupled to the first member and having marks to indicate orientation with respect to the key blank, a third member movably coupled to the first member and having a hole sized to receive a drill bit, and key blanks which may be received in a variety of different locks.

In yet another aspect of the invention, the first member is a stud adapted to receive a key blank, the second member is a dial ring having graduations around a circumferential edge of the ring, and the third member is a guide assembly which is rotatably mounted to the stud. The guide assembly has an aperture for receiving a drill bit. The aperture may be aligned with the graduations on the dial ring by rotating the guide assembly, whereby a desired location for drilling into the lock is indicated.

In yet another aspect of the invention, a method for gaining access to a locked enclosure includes selecting a key blank corresponding to the lock, coupling the key blank to a lock drilling template, inserting the key blank into the lock, manipulating the template to locate a desired drilling location, and drilling a hole into the lock at the indicated location.

These and other aspects, advantages, objectives and features of the invention will become more readily apparent to those of ordinary skill upon review of the following Detailed Description of an illustrative embodiment of the invention.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

FIG. 1 is a perspective view of an exemplary lock drilling template of the present invention;

FIG. 2 is a section view of the lock drilling template of FIG. 1, taken along line 2—2; and FIG. 3 is an end view of the lock drilling template of FIG. 1, taken along line 3—3.

DETAILED DESCRIPTION

Referring to FIGS. 1–3 there is shown an exemplary lock drilling template 10 of the present invention. The exemplary template 10 includes a key stud 12 to which a dial ring 14 and a drill guide assembly 16 are mounted. The key stud 12 includes a slot 18 formed into one end of the stud 12 for receiving the end of a key blank or stub 20. The key stud 12 includes a threaded portion 22 for receiving a nut 24 onto the stud 12 and may be formed by machining a standard bolt. In an exemplary embodiment, the key stud 12 is formed from a ½-13 UNC-2B hex head bolt. Because different key blanks 20 may be required to use the template with different locks, several key studs 12 may be used interchangeably with the other components of the template, whereby each stud 12 has a different sized slot 18 to receive the different key blanks 20. The key stud 12 may further include a hole 26 formed radially through a side of the stud and near the slot 18 so that the key blank inserted in the slot 16 may be retained, such as by a pin or set screw.

The template further includes a disc-shaped dial ring 14 mounted on the stud 12 near the slotted end. The dial ring 14 has a central hole 28 sized to receive the key stud 12 and has graduations 30 on an outer surface. A counter-bored tapped hole 32 is formed radially through the dial ring 14 to the central hole 28, whereby the dial ring 14 may be oriented on the key stud 12 to align the tapped hole 32 with the hole 26 on the key stud 12 and a set screw 34 may be inserted through the holes 26, 32 to retain a key blank 12 inserted into the slot 18. The set screw 34 also secures the dial ring 14 to the key stud 12 and relative to the key blank 20.

The drill guide assembly 16 is also a disc-shaped member with a central hole 35 sized to receive the key stud 12. The guide assembly 16 is mounted on the key stud 12 adjacent the dial ring 14 and may freely rotate on the stud 12 relative to the dial ring 14 and key blank 20. The guide assembly 16 further includes a hole 36 formed through the face 38 of the disc and sized to receive a drill bit 39. In an exemplary embodiment, a drill bushing 42 is press-fit into the drill hole 40 to provide a durable surface for receiving the drill bit 39. In the exemplary embodiment shown in FIG. 3, the dial ring 14 further includes an arcuate slot 43 formed through the dial ring 14 so as not to obstruct the drill bit 39 inserted through the hole 36 in the guide assembly 16. Advantageously, the graduations 30 on the dial ring 14 extend substantially along the length of the arcuate slot 43 to define the range of locations where a hole may be drilled using the drilling template 10. The guide assembly 16 may further include a hash mark 44 on a surface of the guide assembly, near the drill hole 36 to facilitate alignment of the drill hole 36 with the graduations 30 on the dial ring 14.

The template 10 may further include a nut 24 mounted on the key stud 12 to permit clamping the moveable guide assembly 16 once a desired orientation relative to the dial ring 14 has been obtained.

In use, an appropriate key blank 20 is inserted into the slot 18 of the key stud 12 and is secured with a set screw 34 installed through the dial ring 14. The template 10 is positioned on a lock 50 by inserting the key blank 20 into the keyway 52 of the lock 50, whereby the proper orientation of the template 10 relative to the lock 50 is achieved. The user may manipulate the guide assembly 16 to align the hash mark 44 on the guide assembly 16 with one of the graduations 30 on the dial ring 14 to position the drill hole 36 at a location near a retainer 54 of the lock 50. The desired index point for the hole is predetermined for the particular lock to be drilled. The hex nut 24 may then be tightened to clamp the guide assembly 16 in the desired position and the user may drill through the housing 56 of the lock 50 using, for example, a 3/16 high-speed drill bit 39 or any other suitable drill bit for drilling hardened material. The user drills through the lock housing 56 and the retainer 54 which secures the bolt or other such device, as best shown in FIG. 2. If there is more than one retainer 54 for a given lock 50, the user loosens the nut 24 on the template and manipulates the guide assembly 16 to align the drill hole 36 with the other retainer locations and repeats the drilling process accordingly. Once all of the retainers 54 have been drilled, the lock cylinder 58 may be removed, whereby access may be gained to the enclosure. Because the lock cylinder 58 is not damaged by the process and apparatus described above, it may be reinstalled and re-used in the enclosure, thereby eliminating the need to replace or re-key the cylinder 58. The cylinder 58 may be reinstalled by replacing the lock retainers 52, which are generally inexpensive items, and the lock 50 returned to working condition by repairing any drilled holes, such as by filling with epoxy or solder.

A method for gaining access to a locked enclosure using a template 10, as described above, includes the steps of selecting a key blank 20 corresponding to the particular lock 50, inserting the key blank 20 into the lock 50, coupling the key blank 20 to the drilling template 10, manipulating the template 10 to locate a desired location for drilling a hole into the lock 50, and drilling a hole into the lock at the indicated position.

While the present invention has been illustrated by the description of the various embodiments thereof, and while the embodiments have been described in considerable detail, it is not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of Applicant's general inventive concept.

What is claimed is:

1. A template for drilling locks, comprising:
   a first member couplable with a first end of a key blank for a lock, whereby a second end of the key blank is insertable into the lock;
   a second member coupled to said first member and having a plurality of visible marks disposed on a surface of said second member for indicating orientation with respect to the key blank; and
   a third member coupled to said first member and having a hole sized to receive a drill bit, said third member movable with respect to said second member to indicate a desired location for drilling into the lock.

2. The template of claim 1 further comprising:
   a visible mark proximate said hole, whereby alignment of said mark on said third member with one of said plurality of marks on said second member indicates the desired location for drilling into the lock.

3. The template of claim 2 further comprising:
   a drill bushing coupled to said third member and sized to receive a drill bit therethrough.

4. A kit for drilling locks, comprising:
   at least one first member couplable with a first end of a key blank for a lock, whereby a second end of the key blank is insertable into the lock;
   a second member coupled to said first member and having a plurality of visible marks disposed on a surface of said second member for indicating orientation with respect to the key blank;
   a third member coupled to said first member and having a hole sized to receive a drill bit, said third member movable with respect to said second member to indicate a desired location for drilling into the lock; and
   a plurality of key blanks, each key blank configured to be received in a different lock, wherein one of said key blanks is selectively coupled with said first member to drill a lock.

5. The kit of claim 4, further comprising:

a visible mark proximate said hole, whereby alignment of said mark on said third member with one of said plurality of marks on said second member indicates the desired location for drilling into the lock.

6. The kit of claim 5, further comprising:

a drill bushing coupled to said third member and sized to receive a drill bit therethrough.

7. A template for drilling locks, comprising:

at least one stud adapted to receive and retain a key blank for a lock;

a dial ring mounted on said stud, said dial ring defining an arcuate slot formed through at least a portion of said ring, and having visible graduations proximate a circumferential edge of said ring; and a guide assembly rotatably mounted on said stud, proximate said dial ring, and defining an aperture for receiving a drill bit therethrough, whereby said aperture may be aligned with said graduations to indicate a desired location for drilling into the lock.

8. The template of claim 7 wherein said stud includes a slot formed into a first end of said stud and a hole formed radially through a portion of said stud, proximate said slot, said slot sized to receive the key blank and said hole adapted to receive a screw for retaining the key blank positioned in said slot.

9. The template of claim 8 wherein said dial ring further includes a tapped hole adapted to receive a screw for securing the key blank positioned in said slot.

10. The template of claim 7 wherein said guide assembly further includes a drill bushing coupled to said guide assembly and sized to receive a drill bit therethrough.

11. The template of claim 7 wherein said guide assembly further includes a visible mark proximate said aperture, whereby alignment of said mark with one of said graduations on said dial ring positions said aperture to indicate the desired location for drilling the lock.

12. A method for opening a lock, comprising:

selecting a key blank corresponding to the lock;

inserting the key blank into the lock;

coupling the key blank to a template for drilling locks;

manipulating the template to locate a desired drill hole location; and drilling a hole into the lock at the indicated location.

13. The method of claim 12 wherein the template comprises a dial ring and a guide assembly and the step of manipulating the template comprises aligning an indicator on the guide assembly with markings on the dial ring.

14. The method of claim 12 wherein the template comprises a hole sized to receive a drill bit and the step of drilling the hole into the lock comprises inserting a drill bit through the hole.

* * * * *